May 23, 1967 H. MANKO 3,320,661
METHOD OF FORMING AND ATTACHING AN ALUMINUM CONDUCTOR
Filed May 19, 1966
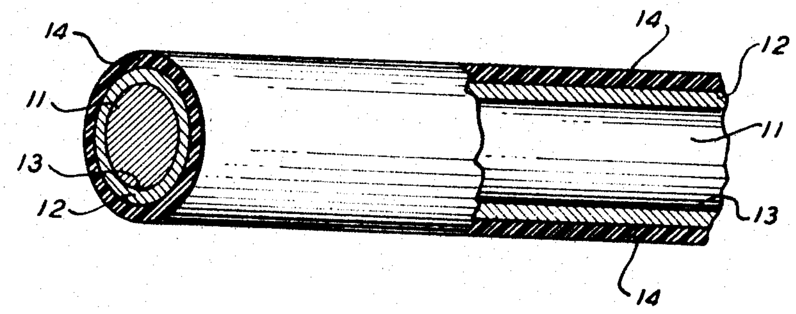
INVENTOR
HOWARD MANKO
BY Norman N. Popper
ATTORNEY 3,320,661

METHOD OF FORMING AND ATTACHING AN ALUMINUM CONDUCTOR

Howard Manko, Teaneck, N.J., assignor to Alpha Metals, Inc., Jersey City, N.J., a corporation of New Jersey Filed May 19, 1966, Ser. No. 551,447
3 Claims. (Cl. 29—155.5)

The invention relates to aluminum conductors and, particularly, to aluminum and its alloys to give conductors having good electrical conductivity, with good thermal conductivity for heat dispersion per unit of weight, which is also cheap, corrosion resistant and resistant to galvanic deterioration.

It is an object of this invention to provide an aluminum conductor which is not subject to galvanic deterioration, when in contact with metals which have a lower electromotive force.

It is another object of this invention to provide an aluminum conductor which is compatible with electrical circuit materials commonly used, such as copper and its alloys, nickel-base alloys, ferrous alloys, etc.

A still further object of the invention is to provide an aluminum conductor of low weight, adequate strength and which is nonmagnetic.

A still further object of this invention is to provide an aluminum conductor which is readily solderable to materials from which electrical circuits are normally made, using mild fluxes such as rosin-base materials, not suitable for soldering bare aluminum.

These objects and advantages, as well as other objects and advantages, may be attained by the product shown in the drawings in which:

FIGURE 1 is a vertical sectional view.

The current steep rise in the price of copper, the metal which is normally used as an electrical conductor, impels the search for a cheaper material for use as an electrical conductor. Aluminum would appear to be an obvious substitute, were it not for the fact that it is incompatible with copper and its alloys, nickel and its alloys, ferrous materials, etc., which are usually used for printed circuits, and other types of electrical circuitry.

By reason of the relatively high galvanic potential of aluminum, when it is soldered to such a metal as copper, deterioration rapidly takes place in the presence of an electrolite, and the connection becomes weakened and eventually useless. Aluminum also appears to be inappropriate because it can only be soldered to other metals such as copper in an electric circuit by the necessary use of highly corrosive fluxes. Since these fluxes are only contained with great difficulty, for they inevitably are dispersed over the entire circuit assembly, they must be removed by various washing procedures; otherwise, they will attack the electrical hardware and ultimately destroy it. Prima facie, aluminum might appear to be the logical contender for the place of copper by reason of its relatively high conductivity, cheapness, adequate strength and light weight, mature consideration seems to dictate that it cannot be so utilized. The present invention is intended to permit the utilization of aluminum conductive members by enabling them to be bonded to copper without the risk of galvanic deterioration and, also, without the necessity for using anything more than the conventional fluxes, which do not attack electrical or electronic circuit assemblies.

Referring now to the drawings in detail, there will be seen to be an aluminum conductor or member 11. While this conductor is shown to be in a shape of a wire, it may be in the shape of a strip, a strap, a bar, a wire having circular, triangular or any other chosen cross-sectional configuration. It is also found that magnesium and its alloys as well may be used as a substitute for aluminum and its alloys by reason of the fact that it has substantially the same attributes as aluminum respecting light weight, adequate strength, high electrical conductivity, good thermal conductivity for heat dispersion. To this conductive member, made of aluminum or magnesium, or alloys thereof, a continuous cover 12 of metal is applied. This metal cover consists essentially of one low melting point metal such as tin. It is, of course, obvious that numerous other solders of varying metal compositions which are well known in the trade, may be used. This cover 12 of low melting point metal is applied continuously to the entire length of the aluminum member 11. It is preferably applied in the molten state and freezes intimately to form a tight bond with the aluminum member 11 wihout any substantially intervening non-metallic layer such as oxides. In order to accomplish this intimate bonding of the low melting point metal with the conductive aluminum or magnesium or alloys thereof, the member must be free of surface skin such as tarnish or the usual tenacious oxide layer. This interface 13 between the low melting point metal and the aluminum must be a very intimate one, and the cover provided by the low melting point metal 12 must be continuous and complete. The metal must be solderable and must have a galvanic potential substantially equal to that of the materials soldered to and ordinarily utilized in electrical circuitry such as copper. In the absence of an intervening non-metallic layer on the surface of the aluminum member and by reason of the intimate interface 13 bond between that member 11 and the solderable cover 12, the aluminum is protected from galvanic deterioration. Furthermore, since the cover 12 of low melting point metal has a galvanic potential substantially equal to that of the material from which the circuit board or other item is made, a soldered union is readily achieved. In this manner, an aluminum conductive member 11 is provided which is not subject to galvanic deterioration, which is readily attachable, by normal soldering procedures, with normal soldering fluxes to normal materials used for electrical circuits. The union so attained, being between a cover on the aluminum, of low melting point metal, which has a galvanic potential substantially equal to that of the circuit material, facilitates a permanent connection of the conductor 11 to a copper circuit board, which connection is not subject to deterioration. If desired, a dielectric sheath 14 may be applied to the cover 13.

The foregoing description is merely intended to illustrate an embodiment of the invention. The component parts have been shown and described. They each may have substitutes which may perform a substantially similar function such as electrodeposition of a high melting-point metal; such substitutes may be known as proper substitutes for the said components, and may have actually been known or invented before the present invention; these substitutes are contemplated as being within the scope of the appended claims, although they are not specifically catalogued herein.

What is claimed:

1. The method for non-galvanic attachment of aluminum conductors to copper circuit boards comprising
   - (a) forming a conductive member of material selected from the group consisting of magnesium, aluminum, or their alloys;
   - (b) applying a continuous, complete, solderable cover on the member comprising essentially at least one low melting point metal of solderable quality having a galvanic potential generally equal to copper with an interface metallic bond between the member and the cover;
   - (c) soldering the cover to a copper circuit board.

2. The method for non-galvanic attachment of aluminum conductors to copper circuit boards comprising (a) the method according to claim 1; and (b) applying a dress of dielectric, moisture resistant material on the cover, readily removable to permit the application of solder to the underlying cover.

3. The method for non-galvanic attachment of aluminum conductors to copper circuit boards comprising (a) the method according to claim 1; and (b) the cover applied being solderable with only a weak flux.

References Cited by the Examiner

UNITED STATES PATENTS

| | | | |
|---|---|---|---|
| 1,079,035 | 11/1913 | Tebbetts | 29—197 |
| 1,101,220 | 6/1914 | Tebbetts | 29—197 |
| 1,405,534 | 2/1922 | Merritt | 29—107 |
| 1,509,102 | 9/1924 | Dana | 29—195 |
| 2,054,054 | 9/1936 | Jarman | 29—197 |
| 2,443,870 | 6/1948 | Reynolds | 29—197 |

HYLAND BIZOT, *Primary Examiner.*